United States Patent
Korst et al.

(10) Patent No.: US 6,745,940 B1
(45) Date of Patent: Jun. 8, 2004

(54) METHOD FOR THE SECURE HANDLING OF MONETARY OR VALUE UNITS USING PREPAID DATA CARRIERS

(75) Inventors: Uwe K. H. Korst, Bensheim (DE); Clemens Wanko, Rödermark (DE)

(73) Assignee: Deutsche Telekom AG, Bonn (DE)

(*) Notice: Subject to any disclaimer, the term of this patent is extended or adjusted under 35 U.S.C. 154(b) by 0 days.

(21) Appl. No.: 09/869,222

(22) PCT Filed: Dec. 6, 1999

(86) PCT No.: PCT/EP99/09531
§ 371 (c)(1),
(2), (4) Date: Jun. 25, 2001

(87) PCT Pub. No.: WO00/39758
PCT Pub. Date: Jul. 6, 2000

(30) Foreign Application Priority Data

Dec. 24, 1998 (DE) .......................... 198 60 203

(51) Int. Cl.⁷ .......................... G06K 5/00; G06F 17/00; G06F 17/60
(52) U.S. Cl. .......................... 235/380; 235/375; 235/379
(58) Field of Search .......................... 235/375, 379, 235/380; 705/65, 66, 67, 72

(56) References Cited

U.S. PATENT DOCUMENTS

| | | | |
|---|---|---|---|
| 4,825,050 A | | 4/1989 | Griffith et al. |
| 4,859,837 A | | 8/1989 | Halpern |
| 5,379,344 A | * | 1/1995 | Larsson et al. ............. 235/380 |
| 5,477,038 A | | 12/1995 | Levine et al. |
| 5,633,930 A | * | 5/1997 | Davis et al. ................... 705/35 |
| 5,721,768 A | * | 2/1998 | Stimson et al. ............. 235/380 |
| 5,721,781 A | | 2/1998 | Deo et al. |
| 5,777,305 A | | 7/1998 | Smith et al. |
| 5,903,633 A | * | 5/1999 | Lorsch ........................ 235/380 |
| 6,330,978 B1 | * | 12/2001 | Molano et al. ............. 235/380 |

FOREIGN PATENT DOCUMENTS

| | | |
|---|---|---|
| DE | 42 43 851 | 6/1994 |
| DE | 44 26 486 | 2/1996 |
| DE | 195 39 801 | 4/1997 |
| DE | 196 04 349 | 8/1997 |
| DE | 196 04 876 | 9/1997 |
| DE | 197 14 259 | 2/1999 |
| EP | 0 397 512 | 11/1990 |
| EP | 0 654 919 | 5/1995 |
| WO | WO 90/15382 | 12/1990 |
| WO | WO 98 52163 | 11/1998 |

* cited by examiner

Primary Examiner—Thien M. Le
Assistant Examiner—April Nowlin
(74) Attorney, Agent, or Firm—Kenyon & Kenyon

(57) ABSTRACT

A payment method in public telecommunications systems uses pre-paid chip cards whose value management and communication is entirely controlled by a background system. A provider gives the chip a definite identification number of identification characteristic(s). A value is assigned to the identification characteristic(s), but not saved on the chip. The value and identification characteristic(s) are made available for a background system via a communications channel and saved in a databank in the communications channel. Label "not cleared" is provided to the identification characteristic(s), and is cancellable by the databank just before the card is sold, making the value ready for debiting. When used, only the identification characteristics are read out from the card to forward the identification characteristic to the background system and request a debit. The background system may release the original value, allocate value to the identification characteristic(s), confirm the debit, and/or sever communications when value is depleted.

8 Claims, 2 Drawing Sheets

METHOD FOR THE SECURE HANDLING OF MONETARY OR VALUE UNITS USING PREPAID DATA CARRIERS

FIELD OF THE INVENTION

The present invention relates to a method for the secure handling of monetary or value units using prepaid data carriers.

BACKGROUND INFORMATION

Various approaches for operating electronic purses on smart cards have been in development and in service for some years. Besides smart card technology, they also include security electronics for cooperation among the smart card, the computer, and the communication system, as well as billing the transactions conducted using the chip card. A number of approaches have been introduced, both on the national and the international level. Electronic purses are in use in some countries, for example:

field trial, Eisenstadt, Austria, since December 1994

Avantcard—in/Finland

Danmond concept in Denmark

Mondex, in Swinton, England in addition, an "intersect electronic purse" (interbranch electronic purse) is standardized under CIN TC224 WG10.

These systems may use the following methodology.

The first step is the loading of monetary value units into the chip card, the comparable amount that the card holder must provide in a cash or also cashless payment being stored in a so-called "pooling account" of the purse operator. If a card holder subsequently pays using his smart card, monetary value units are deducted from the electronic purse and transferred with the assistance of a security module to a terminal of the service provider. There, the received monetary value units are either accumulated into one amount and settled with the purse operator, or each individual payment operation is submitted to the purse operator for billing. Accumulated amounts or individual data records are either collected on a so-called dealer that the service provider must submit, or transferred on-line, using a suitably equipped terminal, to an accounting unit.

Electronic purse applications which are implemented on a microprocessor card are available. In microprocessor applications, the application is controlled by a chip card operating system, as defined, for example, by the prEN726-3 standard. This application may be distinguished by the storing of monetary amounts on the card, which are reduced by a set amount with every debit charge. Available microprocessor cards, unlike available memory cards, can verify whether the debiting system is authentic, and vice versa. This verification may not be possible using a memory chip card. Moreover, similar systems and methods appear to be discussed in U.S. Pat. No. 4,859,837, PCT Patent Publication No. WO 90/15382 and German Patent Publication No. 42 43 851. German Patent Publication No. 196 04 876 discusses a method for controlling transactions conducted in electronic purse systems.

U.S. Pat. No. 5,777,305 discusses a so-called "prepaid card", i.e., a card provided with a credit balance and having a specific identifier, which, after being identified by a background system, is deactivated or activated. Following identification, the background system controls the communication and the further sequence of operations. In the process, the information from the prepaid card is read in via a customary terminal. The billing of accounts also takes place under the control of the background system. The value stored on the card is reduced at the time of use, depending on the service.

U.S. Pat. No. 4,825,050 discusses a data protection system, which employs cryptographic techniques for financial transactions.

European Patent Publication No. 0 397 512 discusses a method for preventing unauthorized use of information stored on a card. In this context, the information to be protected is stored both in the card as well as in a background system and, if required, compared to one another. However, due to the time-consuming, repeated comparison operations, a method of this kind may not only be time consuming, but may also require substantial memory space.

U.S. Pat. No. 5,477,038 discusses a method for using prepaid cards. Besides the card identification number, in this case, the card employed also contains a bank identification number and an account number. These data are stored in a magnetic strip that is placed on the card. In spite of the different identification numbers provided, a method of this kind is not secure, since the numbers can be read out from the card for a targeted misuse.

U.S. Pat. No. 5,721,781 discusses an authentication system and method for smart card transactions. In this method, however, only the operation between the card and a terminal is described; the entire system does not have any background system. The three-tiered authentication discussed here may be very complicated, time-consuming, and may require considerable outlay for memory, which is why it may not be suited for large transaction systems having sizable data-processing systems. European Patent Publication No. 0 654 919 discusses authenticating one system part by another system part of an information transfer system in accordance with the challenge and response principle. In this authentication method, a restriction inhibiting computational operations is initially set up in a portable data carrier arrangement, and this can only be canceled by altering an error counter reading. Once the error counter reading has been altered incrementally, and the restriction has been canceled, random data are transmitted as challenge data from the terminal to the portable data carrier arrangement. From the challenge data, authentication parameters are calculated in each case, using at least one algorithm and secret key data, both in the terminal and in the portable data carrier arrangement. The terminal transmits its authentication parameters as a response to the portable data transmission arrangement, where they are compared to the authentication parameters calculated there. If they correspond, the value memory can be reloaded and/or the error counter reset.

International Patent Publication No. WO 98/52163 discusses a method and a circuit arrangement for securely transporting data on an IC card. The data include, for example, application programs, at least one portion of the data being encrypted and a so-called public cipher key being used.

The mostly widely disseminated cards may be phone cards. Phone cards are memory chip cards having an identification region and at least one counter area. Moreover, a service designated as virtual calling card (VCC) has been introduced in the U.S. It allows the customer to place a phone call from any telephone by specifying an access identifier in conjunction with a PIN (personal identification number). These so-called calling card systems may be based on a central control unit having a suitable database and, accordingly, a central computer. Charges are billed, in this context, to an account allocated to the customer. A service of this kind may be becoming increasingly important in Europe. Thus, for example, the February 1995 issue, pp. 44 and 45, of "Deutsche Telekom AG—Vision" describes the T-Card used for the connect service of Deutsche Telekom.

This article further discusses that the spectrum of services extends from phone cards to credit cards. For example, paragraph 4.1.2.1., starting on page 61 of the book "Chipkarten als Werkzeug" ("Chip Cards as Tools") by Beutelsberger, Kersten and Pfau, discusses how memory chip cards are authenticated by employing available challenge-response methods. With the aid of a terminal or card reader, these chip cards are able to identify the cards and check them for plausibility. An authentication is undertaken in a security module built into the terminal.

German Patent Publication No. 196 04 349 discusses a method for verifying memory chip cards which appears to enable a two-tiered or multi-tiered authentication to be performed with the assistance of cryptographic functions and a terminal.

It is believed that the drawback of the methods and systems discussed herein lies in that the particular value, i.e., the value units, is/are stored on the data carrier, for example of the smart card or of the microprocessor card. The terminals recognize the value stored on the data carrier and reduce the value on the data carrier depending on the price of a service that is bought or sold. Due to the large number of prepaid data carriers in circulation, one may not have kept so-called shadow accounts or shadow balances in the terminals and/or their background systems. Thus, it may not be possible for the terminals and their background systems to verify, for example, the set value of a data carrier that is in use. By manipulating or falsifying the data carrier, one can, therefore, generate monetary or value units that the operator of a transaction system would actually be entitled to. Current estimates place the resultant global losses suffered by the operators on a monthly basis, at a two-digit amount in the millions.

Systems having shadow accounts or shadow balances may require that large volumes of data be transmitted in the system. Further, many terminals are not connected on-line, but only transmit the data records with a time delay. For that reason, manipulations are not immediately detectable.

SUMMARY OF THE INVENTION

An exemplary method of the present invention provides a method for securely handling monetary or value units using prepaid data carriers, such as smart cards, magnetic strip cards, or the like, in electronic transaction systems, such as phone card systems, purse systems, and the like, which will render any card manipulation worthless and, where necessary, will reduce the substantial outlay for data communications in the available or similar systems.

When the exemplary method according to the present invention is applied, a potential cheater or attacker is forced to manipulate or scan the background system of the operator, i.e., to probe through various identification patterns to arrive at the equivalent of a particular data carrier or smart card. This is much more difficult for the cheater to do, than is manipulating the particular data carrier in the form of a memory chip card or a microprocessor chip card. On the other hand, it is much simpler for the operator to protect a central background system in a secured environment from unauthorized access. For example, if a cheater discovers an identification pattern by scanning, then all that is available to him is merely the equivalent of this one data carrier or identification pattern. The same effort is required for of him to scan the next identification pattern. Important in this case is that the manipulation of the data carriers themselves is made ineffective by this method. The value of a copy, i.e., of a simulation of data carriers, would also be limited to only the particular, small active value of the individual data carrier. A further benefit of the exemplary method is that it may reduce the high expenditure for data transmission required by available methods that involved shadow accounts. The reaction times in response to recognized security problems in the background system are substantially shorter than previous methods, and the allocation of service features for identification purposes can now be undertaken in the central computer or in the central control unit of the background system.

DETAILED DESCRIPTION

Figure 1:
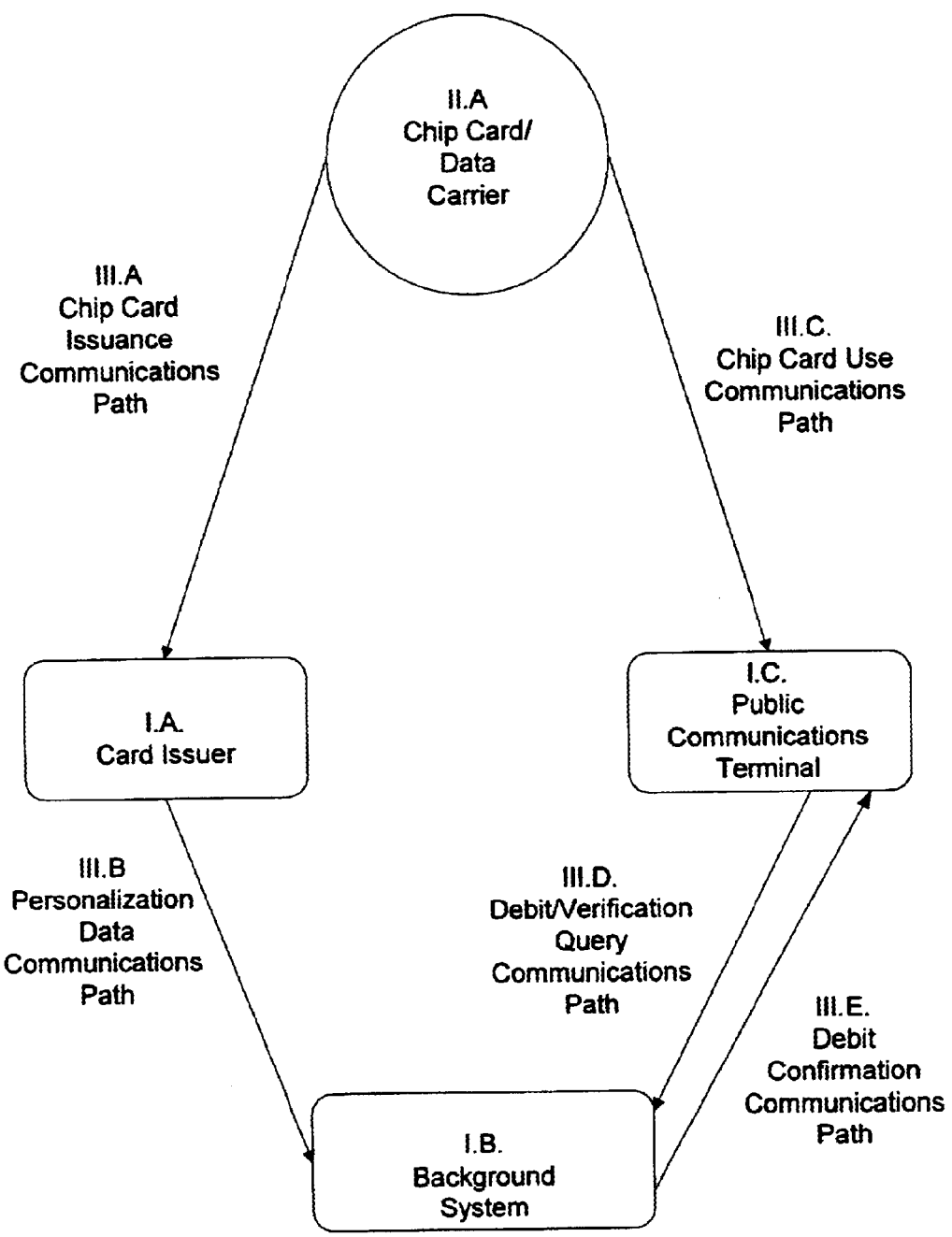
FIG. 1 shows an operational diagram of an exemplary embodiment and/or exemplary method of the present invention.

According to an exemplary embodiment and/or exemplary method of the present invention, a customer purchases a phone card. The phone card contains the phone card ID 12345 . . . , for example, stored in a chip, where ID is an identification. When the customer inserts the card into a card telephone, this telephone reads out the ID and establishes a connection to the background system. The ID is communicated to the background system via this connection. The background system can then allocate a value in the form of units or appropriate monetary units to the ID. At this point, the customers begins to dial a phone number. However, the dialup information is not analyzed by the cardphone, but rather merely routed from there to the background system. Here, the dialup information is analyzed; the connection is set up depending on the still existing credit balance, and the call is disconnected upon reaching a zero credit balance.

By using a central background system (similar to that of a calling card system) to control the connection, virtually all imaginable services can be offered and (since they are centralized) easily administered and further developed.

In addition, a specific rate scale can be assigned to the ID (for example, if the card=ID were sold in the context of a special offer, combined with very favorable call conditions, then this can be transacted by assigning the appropriate rate scale). In this manner, very different features and services can be combined.

The exemplary method described here makes it possible, when a data carrier is located beyond the range of the particular operator and belongs to a user or customer who is, therefore, in an unsecured environment, for the data carrier to no longer contain the monetary or unit value, but just a unique identification pattern, for example a serial number, a cryptogram, an encryption key, or the like. In response to a use, the identification pattern is queried by the terminal. On the basis of the identification pattern, the data carrier uniquely identifies itself to a terminal and to its background system(s). The monetary or unit value allocated to the data carrier is reduced in the operator's background systems as a function of the service sold or purchased.

To make it more difficult for an attacker or potential cheater to access an identification pattern, such as by scanning, the most complex possible identification pattern should be selected, that can, moreover, also be stored as a cryptographically secured pattern on the data carrier.

The identification pattern is accomplished as a so-called public cryptographic key that is uniquely provided for each data carrier. A terminal/background system sends a so-called challenge to the data carrier, which encrypts it, itself, using its stored cryptographic key. The result is the so-called response, which is sent back to the operator's background system or terminal. The so-called secret key stored for precisely this one data carrier, in the operator's background systems, is used by the background system to decrypt the response. If the challenge and response match, then the data carrier is authentic. Moreover, an additional tracking of monetary and value units is secured, if need be cryptographically, on the data carrier for performing a plausibility check.

In the exemplary method diagram of FIG. 1, smart cards used in public telecommunications are provided in the form of memory chip cards or microprocessor chip cards. These smart cards do not require special security properties. When personalizing the smart cards, one merely has to take into consideration that the identification feature is randomly selected from a range of values or domain that is larger by several dimensions. As an example: issued cards, altogether=106 units, range of values=1012, from which, a card number of 12-digit length is derived. The diagram according to FIG. 1 is basically subdivided into the telecommunications infrastructure I, customer area II, and communications paths III.

The exemplary method now proceeds as follows: a memory or microprocessor chip of a phone card, for example, is personalized by the card issuer I A, i.e., provided with a unique identification feature, such as a card number. This identification feature is assigned a value (for example x DM or x units), which, however, is not stored or provided in the chip. Together with the identification feature, the value is made available to the background system I B via communications path III B. There, the identification feature is stored, together with the value, in a database. In this context, the storage process is initially carried out with the qualifier "not released".

Immediately before the phone card is sold by the card issuer, the qualifier "not released" is removed from the database of background system I B. Thus, the value of the particular card is available to be debited in background system I B. If, at this point, a customer II uses such a chip card II A at a public communications terminal I C provided for this purpose, then the telecommunications terminal merely reads out the identification feature from the card, in order to pass it on to background system I B, i.e., it executes a verification query III D. To the identification feature, the background system now adds its value originally assigned at the time of personalization, and, given a sufficient credit balance or funds, the communication is released, i.e., a debit confirmation III E follows. In this case, the communications connection is directly handled and controlled by background system I B. Thus, once the full card value is debited in the database of background system I B, a call can be disconnected by the same.

Figure 2:
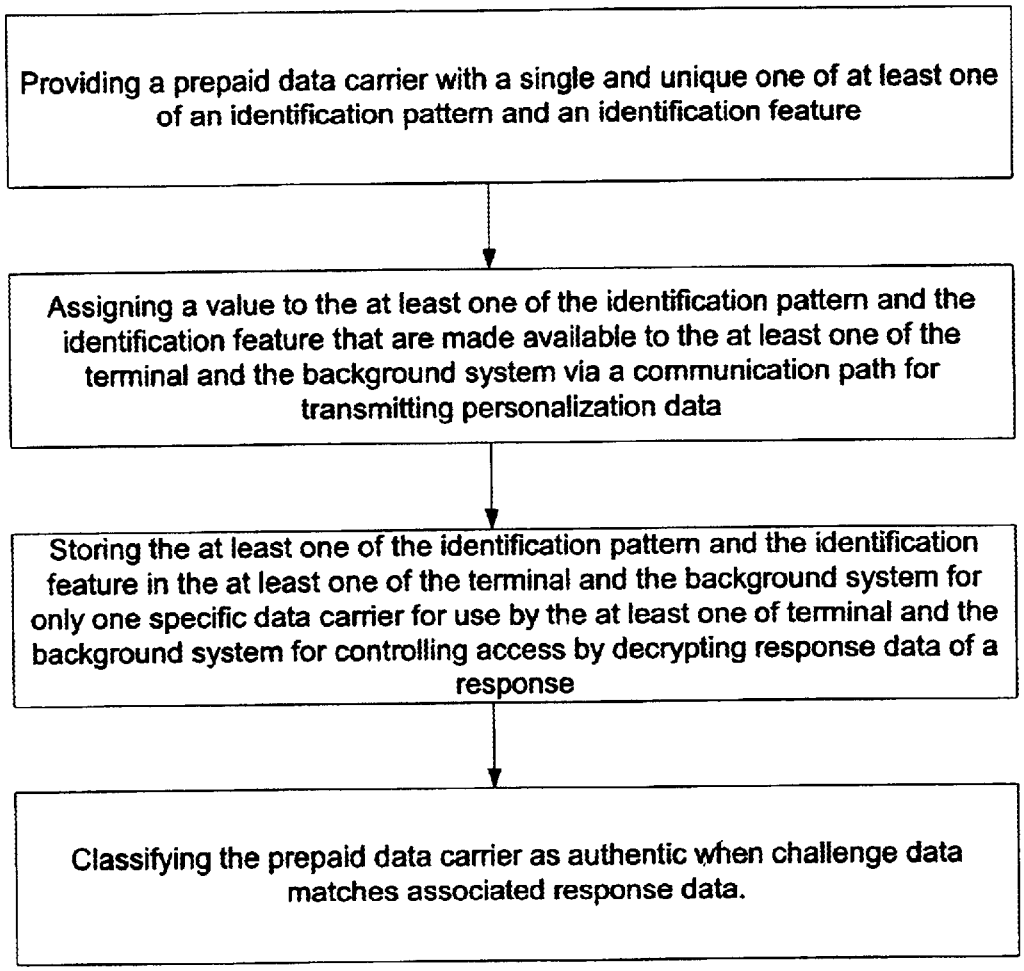
FIG. 2 shows a chart of an exemplary embodiment and/or exemplary method of the present invention.

In the exemplary diagram of FIG. 2, the first block indicates that a prepaid data carrier is provided, the prepaid data carrier having a single and unique one of at least one of an identification pattern and an identification feature. The second block indicates that a value is assigned to the at least one of the identification pattern and the identification feature that are made available to the at least one of the terminal and the background system via a communication path for transmitting personalization data. The third block indicates storing the at least one of the identification pattern and the identification feature in the at least one of the terminal and the background system for only one specific data carrier for use by the at least one of terminal and the background system for controlling access by decrypting response data of a response. The fourth block indicates classifying the prepaid data carrier as authentic when challenge data matches associated response data.

What is claimed is:

1. A method for at least one of securely handling and securely manipulating at least one of monetary units and value units using a prepaid data carrier, which is prepaid by at least one of a customer and a user and which is personalized by a card issuer, the prepaid data carrier being for uniquely identifying itself to at least one of a terminal and a background system, and the at least one of the monetary units and the value units being for use in assigning an amount, depending on at least one of a sold service and a purchased service, to the prepaid data carrier, the amount being subsequently automatically reduceable and administerable in the at least one of the terminal and the background system, the at least one of the terminal and the background system communicating in a particular network node, the method comprising:

providing the prepaid data carrier with a single and unique one of at least one of an identification pattern and an identification feature;

assigning a value to the at least one of the identification pattern and the identification feature that are made available to the at least one of the terminal and the background system via a communication path for transmitting personalization data;

storing the at least one of the identification pattern and the identification feature in the at least one of the terminal and the background system for only one specific data carrier for use by the at least one of terminal and the background system for controlling access by decrypting response data of a response; and classifying the prepaid data carrier as authentic when challenge data matches associated response data.

2. The method of claim 1, wherein the at least one of terminal and the background system directly administers and controls a communication connection, and the at least one of the identification pattern and the identification feature of the data carrier includes a public cryptographic key existing only once for each prepaid data carrier, further comprising:

assigning a specific rate chart to the at least one of the identification pattern and the identification feature.

3. The method of claim 2, wherein the at least one of the identification pattern and the identification feature is complex for making scanning by an unauthorized entity difficult.

4. The method of claim 1, wherein the at least one of the identification pattern and the identification feature is complex for making scanning by an unauthorized entity difficult.

5. The method of claim 1, wherein the at least one of the identification pattern and the identification feature includes at least one of a serial number, a cryptogram, and an encryption key.

6. The method of claim 1, wherein the prepaid data carrier is used in at least one of an electronic transaction system, a phone card system, and a purse system.

7. A method for at least one of securely handling and securely manipulating at least one of monetary units and value units using a prepaid data carrier, which is prepaid by at least one of a customer and a user and which is personalized by a card issuer, the prepaid data carrier being for uniquely identifying itself to a background system, and the at least one of the monetary units and the value units being for use in assigning an amount, depending on at least one of a sold service and a purchased service, to the prepaid data carrier, the amount being subsequently automatically reduceable and administerable in the background system, the at least one of the terminal and the background system communicating in a particular network node, the method comprising:

providing the prepaid data carrier with a single and unique one of at least one of an identification pattern and an identification feature, wherein the prepaid data carrier is personalized with personalization data by the card issuer;

assigning a value to the at least one of the identification pattern and the identification feature, both the identification pattern and the identification feature being made available to the background system via a communication path for transmitting the personalization data;

storing both the identification pattern and the identification feature at the background system with a qualifier "not released;"

removing the qualifier from the background system immediately before or when the prepaid data carrier is sold;

supplying automatically the identification patter to a terminal in response to use, without assistance of a user;

adjusting automatically in the background system the at least one of monetary units and value units assigned to the data carrier, on basis of at least one of the identification pattern and the data carrier uniquely identifying itself to the background system.

8. The method of claim 7, further comprising:

requesting input of further identification features by the user before completing verification.

* * * * *